United States Patent
Gunderson

(10) Patent No.: US 10,229,159 B2
(45) Date of Patent: Mar. 12, 2019

(54) DATA SURFACING CONTROL FRAMEWORK

(71) Applicant: Microsoft Technology Licensing, LLC, Redmond, WA (US)

(72) Inventor: Karl N. Gunderson, West Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 459 days.

(21) Appl. No.: 14/698,013

(22) Filed: Apr. 28, 2015

(65) Prior Publication Data

US 2016/0321320 A1 Nov. 3, 2016

(51) Int. Cl.
*G06F 17/30* (2006.01)

(52) U.S. Cl.
CPC .............. *G06F 17/30477* (2013.01)

(58) Field of Classification Search
CPC ...................................... G06F 17/30
See application file for complete search history.

(56) References Cited

U.S. PATENT DOCUMENTS

| 6,360,246 B1* | 3/2002 | Begley ................. H04L 69/329 709/203 |
| 7,565,394 B1* | 7/2009 | Stewart ................. G06Q 10/06 707/999.01 |
| 7,584,192 B2 | 9/2009 | Rey et al. |
| 7,917,575 B1 | 3/2011 | Stewart et al. |
| 8,650,150 B2 | 2/2014 | Zhao et al. |
| 8,875,137 B2 | 10/2014 | Kaufmann et al. |
| 2007/0088689 A1* | 4/2007 | Cras ................. G06F 17/30398 707/999.004 |
| 2008/0046833 A1 | 2/2008 | Patz et al. |
| 2008/0091709 A1* | 4/2008 | Chang ................. G06Q 10/06 707/999.102 |
| 2010/0229084 A1* | 9/2010 | Lee ................. G06Q 10/10 715/249 |
| 2011/0246344 A1* | 10/2011 | Rajeshvincent ........ G06Q 10/10 705/35 |
| 2013/0031491 A1* | 1/2013 | Tobin ................. G06Q 10/06 715/760 |

OTHER PUBLICATIONS

"AX2012 Print Management integration Guide", Microsoft Dynamics 2012, Available at least as of Mar. 30, 201 19 pages.

(Continued)

*Primary Examiner* — Khanh B Pham
(74) *Attorney, Agent, or Firm* — Christopher J. Volkmann; Kelly, Holt & Christenson, PLLC

(57) ABSTRACT

A parallel processing framework comprises, in one example, a data gathering system configured to receive a set of data requests, each corresponding to at least one structured data representation (SDR). The data gathering system is configured to obtain a data set for each of the data requests. The parallel processing framework comprises an SDR generation system configured to receive indications of the plurality of data requests and, for each data request, an indication as to whether the data set corresponding to the data request has been obtained by the data gathering system. The SDR generation system is configured to generate the plurality of SDRs based on the data sets obtained by the data gathering system.

20 Claims, 15 Drawing Sheets

(56) References Cited

OTHER PUBLICATIONS

"Developing a SSRS report using the Report Data Provider in Microsoft Dynamics AX 2012", Available at least as of Mar. 30, 2015, 12 pages.
Newell, Eric, "Dynamics AX 2012 Print Management", Available at least as of Mar. 30, 2015, 2 pages.
"Report Programming Model for Microsoft Dynamics AX 2012", Available at least as of Mar. 30, 2015, 37 pages.
"Using Controller Class in Developing SSRS Reports in Microsoft Dynamics AX 2012", Available at least as of Mar. 30, 2015; 5 pages.
Nuthakki et al., "Reporting in Microsoft Dynamics AX 2012", Chapter 1, Microsoft Corporation, Dec. 5, 2011, 6 pages.
Nuthakki et al., "Reporting in Microsoft Dynamics AX 2012", Chapter 2, Microsoft Corporation, Dec. 5, 2011, 21 pages.
"Reporting in Microsoft Dynamics AX 2012, Chapter 1: Overview", Dec. 5, 2011, 6 pages.
"Reporting in Microsoft Dynamics AX 2012, Chapter 2: SQL Server Reporting Services", Dec. 5, 2011, 39 pages.
"Reporting in Microsoft Dynam Dynamics AX 2012, SQL Server Reporting Services", Dec. 5, 2011, 1 page.
"Reporting in Microsoft Dynamics AX 2012, Chapter 2, SQL Server Reporting Services", Dec. 5, 2011, 2 pages.
"Reporting in Microsoft Dynamics AX 2012", Dec. 5, 2011, 1 page.
"Banco Caminos is now able to generate its Business Documents in Web Environments, Printing and Distributing them by e-mail or fax with DocPath", Retrieved on: Feb. 19, 2015 Available at: http://www.docpath.com/cs-banco-caminos.aspx#.
"Grupo Proselco has Implemented an Automatic Invoicing system that uses the DocPath Docs-on-Demand", Retrieved on: Feb. 19, 2015 Available at: http://www.docpath.com/cs-proselo.aspx.
"Centralizing Document Generation", Retrieved on: Feb. 19, 2015 Available at: http://www.docpath.com/ie-health-inn-document-software.aspx.
"TRADEPAQ™ for Logistics", Retrieved on: Feb. 19, 2015 Available at: http://www.tradepaq.com/downloads/productsheet_logistics.pdf.
"Enterprise Document Management—TRADEPAQ", Published on: Jun. 12, 2010 Available at: http://www.tradepaq.com/?page=prpducts-edm.
Olivares, Julio, "Output Management: The Intelligence Applied to the Processes of Document Technology", Published on: Apr. 24, 2010 Available at: http://www.docpath.com/art-document-output-management-software.aspx.
"Implementation Schemes",Retrieved on: Feb. 19, 2015 Available https://www.google.co.in/url?sa=t&rct=j&q=&esrc=s&source=web&cd=2&cad=rja&uact=8&ved=0CCMQFjAB&url=http%3A%2F%2Fwww.docpath.com%2Finfoprint%2FFileDownload.aspx%3Ffilename%3DDocPath_Implementation.pdf&ei=f7DqVOf8D4PubQSI9oD4DQ&usg=AFQjCNFW8RrYWwtFC3m_ErZBocRYb9AOLw&bvm=bv.86475890.d.c2E.
Baid, Ankit, "Improve Output Document Management Performance with Best Suited Architectures", In White Paper, Apr. 2012, 16 pages.
"CommodityPoint, a division of UtiliPoint International Inc", Published on: May 2011 Available at: http://www.aspectenterprise.com/pdf/ctrm_sourcebook.pdf.

\* cited by examiner

| Sequence Number (320) | Destination ID (322) | Data Set ID (324) | Completion Flag (326) |
|---|---|---|---|
| 1 | Printer 1 | Table 4 | T |
| 2 | File A | Table 6 | F |
| 3 | Printer 1 | Table 3 | T |
| 4 | Printer 2 | Table 2 | F |
| 5 | Printer 1 | Table 9 | F |
| 6 | Printer 2 | Table 7 | T |
| 7 | File B | Table 1 | T |
| 8 | Email | Table 10 | T |
| 9 | Email | Table 8 | F |
| 10 | File A | Table 5 | T |

FIG. 8

DATA SURFACING CONTROL FRAMEWORK

BACKGROUND

Computing systems are currently in wide use. As one example, a computing system stores data as entities or other data records, and commonly includes process functionality that facilitates performing various processes or tasks on the data. Users log into or otherwise access the computing system in order to perform the processes and tasks. The data can include user data as well as entities or records that are used to describe various aspects of the computing system.

An organization may use a computing system to create, track, and manage various aspects of the organization and to conduct a variety of different activities. A user may desire to surface data about various aspects related to the organization, such as to generate reports. These reports can be sent to a variety of destinations. For example, they can be printed, saved to file, and/or electronically sent to recipients.

The discussion above is merely provided for general background information and is not intended to be used as an aid in determining the scope of the claimed subject matter.

SUMMARY

In a computing system, a data store stores data including, but not limited to, user data as well as entities and records that are used to describe various aspects of the computing system. The computing system includes a framework for surfacing the data, for example in response to a user request.

In one example, a parallel processing framework comprises a data gathering system configured to receive a set of data requests, each corresponding to at least one structured data representation (SDR). The data gathering system is configured to obtain a data set for each of the data requests. The parallel processing framework comprises an SDR generation system configured to receive indications of the plurality of data requests and, for each data request, an indication as to whether the data set corresponding to the data request has been obtained by the data gathering system. The SDR generation system is configured to generate the plurality of SDRs based on the data sets obtained by the data gathering system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 8 illustrates one example of a request table.

DETAILED DESCRIPTION

Figure 1:
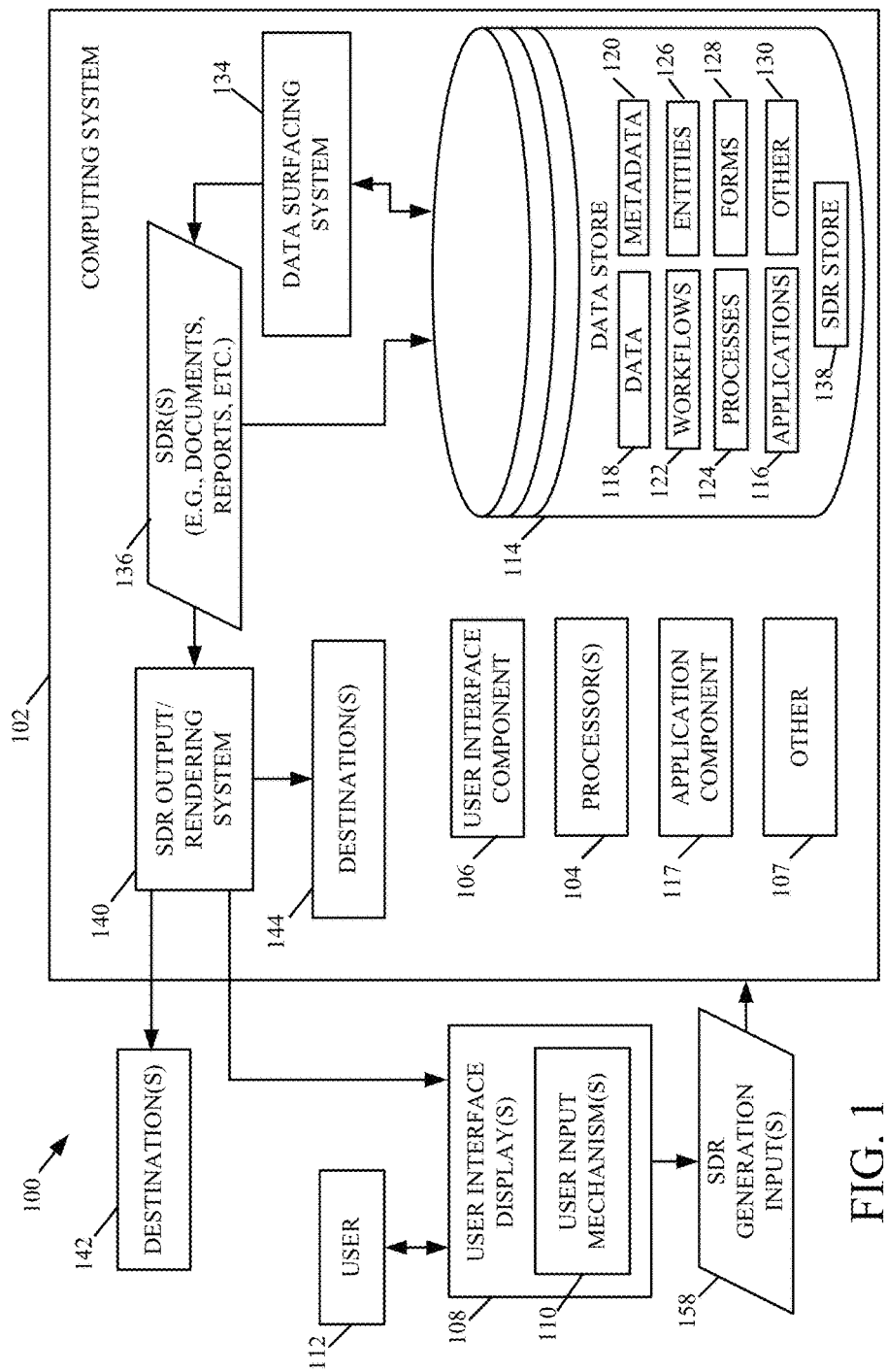
FIG. 1 is a block diagram of one example of a data accessing architecture.

FIG. 1 is a block diagram of one example of a data accessing architecture 100. Architecture 100 includes a computing system 102 that is accessible by one or more users through one or more user interface displays. As shown in FIG. 1, computing system 102 includes one or more processor(s) 104 and a user interface component 106. User interface component 106 generates user interface display(s) 108 with user input mechanisms 110, for interaction by a user 112. Computing system 102 can include other items 107 as well.

User 112 can access computing system 102 locally or remotely. In one example, user 112 uses a client device that communicates with computing system 102 over a wide area network, such as the Internet. User 112 interacts with user input mechanisms 110 in order to control and manipulate computing system 102. For example, using user input mechanisms 110, user 112 can access data in a data store 114. User data access can include, but is not limited to, read access, write access, and/or update access to the data. Updating data can include modifying and/or deleting data in data store 114.

User input mechanisms 110 sense physical activities, for example by generating user interface display(s) 108 that are used to sense user interaction with computing system 102. The user interface display(s) 108 can include user input mechanism(s) 110 that sense user input in a wide variety of different ways, such as point and click devices (e.g., a computer mouse or track ball), a keyboard (either virtual or hardware), and/or a keypad. Where the display device used to display the user interface display(s) 108 is a touch sensitive display, the inputs can be provided as touch gestures. Similarly, the user inputs can illustratively be provided by voice inputs or other natural user interface input mechanisms as well.

Computing system 102 can be any type of system accessed by user 112. In one example, but not by limitation, computing system 102 can comprise an electronic mail (e-mail) system, a collaboration system, a document sharing system, a scheduling system, and/or an enterprise system. In one example, computing system 102 comprises a business system, such as an enterprise resource planning (ERP) system, a customer resource management (CRM) system, a line-of-business system, or another business system.

As such, computing system 102 includes applications 116 that can be any of a variety of different application types. Applications 116 are executed using an application component 117 that facilitates functionality within computing system 102. By way of example, application component 117 can access information in data store 114. For example, data store 114 can store data 118 and metadata 120. The data and metadata can define work flows 122, processes 124, entities 126, forms 128, and a wide variety of other information 130.

By way of example, application component 117 accesses the information in data store 114 in implementing programs, workflows, or other operations performed by application component 117.

Processor(s) 104 comprises a computer processor with associated memory and timing circuitry (not shown). The processor is illustratively a functional part of system 102 and is activated by, and facilitates the functionality of, other systems, components and items in computing system 102.

FIG. 1 shows a variety of different functional blocks. It will be noted that the blocks can be consolidated so that more functionality is performed by each block, or they can be divided so that their functionality is further distributed. It should also be noted that data store 114 can be any of a wide variety of different types of data stores. Further, the contents of data store 114 can be stored in multiple data stores. Also, the data stores can be local to the environments, agents, modules, and/or components that access them, or they can be remote from and accessible by those environments, agents, modules, and/or components. Similarly, some can be local while others are remote.

Computing system 102 includes a data surfacing system 134 that facilities surfacing of data to one or more destinations. In the example of FIG. 1, data surfacing system 134 is configured to access data in data store 114 (e.g., data 118 or any other information in data store 114) to generate one or more structured data representations 136. Before describing the operation of data surfacing system 134 in further detail, a brief overview will be provided.

A structured data representation (SDR) comprises a collection of data in any format. For example, by not by limitation, an SDR comprises a document or a collection of documents that is consumed within computing system 102 and/or output for consumption by another system. In one particular example, an SDR comprises a report that is generated from data in data store 114. By way of illustration, but not by limitation, in the case of an organization, a report can include invoices, statements, orders, etc.

Data surfacing system 134 accesses data store 114 to generate one or more SDRs 136, which can be stored in an SDR store 138 and/or output to one or more destinations. In the illustrated example, an SDR output/rendering system 140 renders SDRs 136 to user 112 through user interface display(s) 108. Alternatively, or in addition, SDRs 136 can be provided to other destination(s) 142 external to computing system 102. In another example, SDRs 136 can be provided to destination(s) 144 within computing system 102. An example of a destination includes, but is not limited to, an electronic display device, such as a computer screen. Another example of a destination includes a system that electronically transmits communications to recipients, such as by facsimile or electronic mail (e-mail). In another example, a destination for an SDR comprises an electronic file system. In another example, a destination for an SDR comprises a system that renders the SDR on a physical medium, such as a printer. These, of course, are examples only.

By way of example, but not by limitation, computing system 102 can be deployed by an organization that manufactures and sells products. As sales orders for a plurality of customers are processed by computing system 102, SDR generation inputs 158 specify that packing slips need to be printed for each sales order. This can include printing both an original packing slip as well as a copy of the packing slip for each sales order. Further, shipping confirmations may need to be sent to a first customer's e-mail address, and multiple printed copies of the shipping confirmations may be printed for internal tracking of the order and to be sent to the customer along with the order. These packing slips and shipping confirmations are examples of SDRs that can be generated by data surfacing system 134 from data store 114.

Embodiments described herein provide a number of features and advantages. By way of illustration, within an example computing environment, generating a document is usually a multi-step process. One step comprises selecting the data for the document and another step comprises generation of the document or report to include the selected data for output. When multiple documents are needed, these two steps are repeated once for each document. This sequential processing of the steps results in significant time and processing bandwidth to generate all documents. That is, the time needed to generate all documents is the sum of the time needed to generate each document. Further, in some computing environments that utilize multiple threads, each thread executes this serial document generation process which can result in the documents being generated out of order by the non-deterministic nature of the multi-threaded processing. Additionally, the repeated processing of each document one at a time results in the document generation process being invoked for each document. Initiating a new process for each document to be generated is computationally expensive as it requires significant processing overhead.

Embodiments described herein provide a parallel processing framework that facilitates the generation of SDRs in a computationally efficient manner that outputs the SDRs quickly. By parallel processing the data requests and corresponding SDR generation operations, the disclosed framework improves the performance of the computing environment in surfacing data, while reducing the required processing overhead and time. Further, as discussed in further detail below, when an output order for the SDRs is important, the framework can run the parallel processes asynchronously, and then resynchronize the generated SDRs for output in the correct output order even though the data generation is performed out of order.

Figure 2:
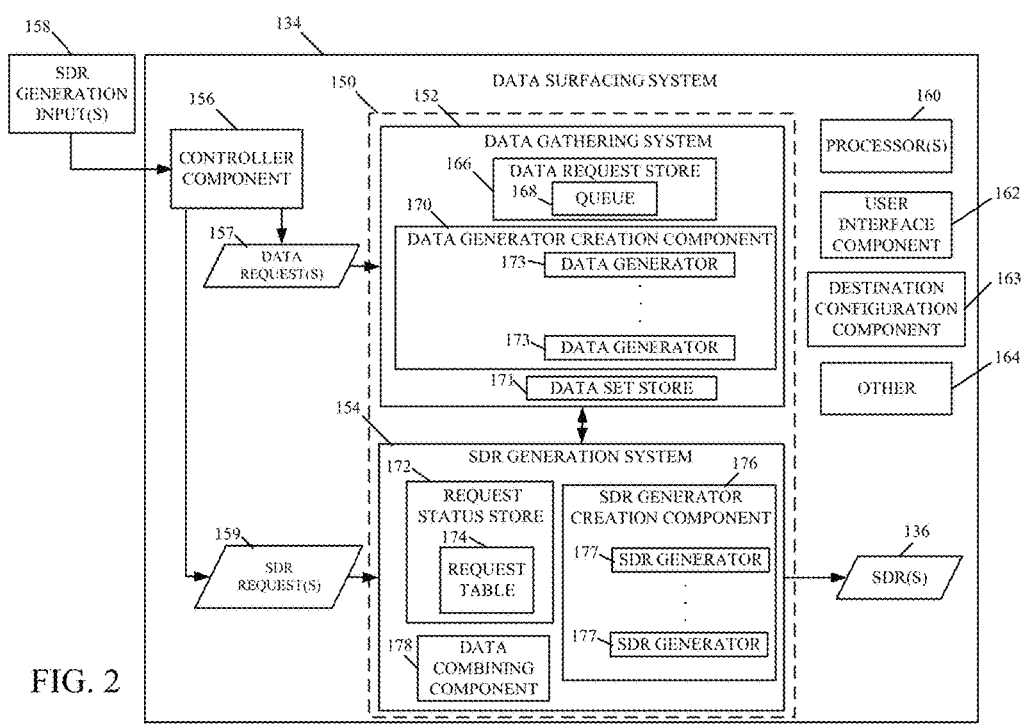
FIG. 2 is a block diagram of one example of a data surfacing system having a parallel processing framework.

FIG. 2 is a block diagram of one example of data surfacing system 134 having a parallel processing framework 150. Framework 150 comprises a data gathering system 152 and an SDR generation system 154 that are configured to operate in parallel to obtain data for and to generate SDRs 136. Data gathering system 152 is configured to perform data gathering tasks to obtain, calculate, or otherwise gather data to be included in the SDRs 136. SDR generation system 154 generates SDRs 136 with the data gathered by data gathering system 152.

In the example of FIG. 2, system 134 includes a controller component 156 that controls framework 150, one or more processors 160, a user interface component 162, and a destination configuration component 163. System 134 can include other items 164 as well.

Controller component 156 receives SDR generation inputs 158. Inputs 158 can be received from any source that requests generation of SDRs 136. For example, SDR generation inputs 158 can be provided by user 112, as illustrated in FIG. 1. In another example, SDR generation inputs 158 can be provided from application component 117 as it executes workflows 122 and/or processes 124. In any case, SDR generation inputs 158 request generation of SDRs 136 and can include corresponding parameters for the data to be included in SDRs 136.

Based on inputs 158, controller component 156 generates requests, with parameters, that are provided to data gathering system 152 and SDR generation system 154. In the illustrated example, for a given input 158 to generate an SDR, controller component 156 divides or decomposes the input into one or more data requests 157 with parameters for gathering or generating the data for the SDR, and an SDR request 159 with parameters for generating the SDR with the data. For example, SDR request 159 can include the destination for the SDR and a format for the SDR. For instance, the format can identify a type of document or report to be generated.

In one example in which SDR generation inputs 158 request generation of a plurality of SDRs, controller component 156 breaks inputs 158 into a series of data requests 157 having a sequential order indicative of a desired output order for the SDRs 136. Each data request 157 has a corresponding SDR request 159 that identifies the destination and/or format for the SDR 136. For instance, an organization may desire to output mailing statements in numerical order by postal code. Controller component 156 provides the requests to data gathering system 152 and SDR generation system 154.

Data gathering system 152 includes a data request store 166 configured to store data requests 157 and corresponding request parameters. In one example, data request store 166 includes a first-in-first-out (FIFO) queue 168 for storing requests 157.

Data gathering system 152 also includes a data generator creation component 170 configured to generate or instantiate one or more data generators 173 to obtain the data for each of the data requests 157. For example, component 170 can instantiate a plurality of data generators 173 that operate in parallel to obtain data for a plurality of data requests 157. A data generator 173 can generate or obtain the data by executing SQL queries to return data from a relational database and/or perform computations on the returned data, for example. The data set obtained for each of the requests is stored in a data set store 171. In one example, data set store 171 comprises a plurality of data tables, each data table being generated and storing data for a request processed by data gathering system 152.

SDR generation system 154 receives SDR requests 159 and maps them to their corresponding data requests 157. In one example, a request status store 172 stores SDR requests 159 along with indications as to whether the data sets for each corresponding data request 157 has been obtained by data gathering system 152. In the illustrated example, request status store 172 is created, updated, and otherwise maintained by SDR generation system 154. In another example, request status store 172 can be maintained external to and accessed by SDR generation system 154.

In the illustrated example, request status store 172 includes a request table 174 having a plurality of entries, each entry representing one of the SDR requests 159. As the data requests 157 are completed by data gathering system 152, request table 174 is updated accordingly.

Using information in request status store 172 that indicates that one or more of the data requests 157 have been processed by system 152 to gather the corresponding data, an SDR generator creation component 176 creates or instantiates corresponding SDR generators 177 that generate SDRs 136. One or more SDR generators 177 can be created for a given destination. Further, a plurality of SDR generators 177 can be instantiated to operate in parallel to generate SDRs for a plurality of SDR requests 159.

The number of SDR generators 177 that are created for the given destination can be based on the type of destination (e.g., whether the given destination is order-dependent or order-independent). An order-dependent destination comprises a device or system where the order (e.g., SDR output order, SDR output grouping, etc.) in which the SDRs are provided to the destination is important for the end use. For example, in some implementations, a printer is an order-dependent destination. In another example, a computer screen can be order-dependent. Examples of order-independent destinations include a file system that stores the SDRs and an email system that electronically transmits the SDRs to recipients. Further, in one example, whether a given destination is considered order-dependent or order-independent for purposes of operation of system 134 is configurable using destination configuration component 163. For instance, user 112 can provide destination configuration inputs to component 163 to set whether a computer screen is considered order-dependent.

A data combining component 178 is configured to combine data sets gathered by system 152 for multiple requests into a single task for a SDR generator 177. For example, in the case of a printer destination, data combining component 178 can combine the data sets for a plurality of requests processed by framework 150 into a single print job to the printer destination.

Figure 3:
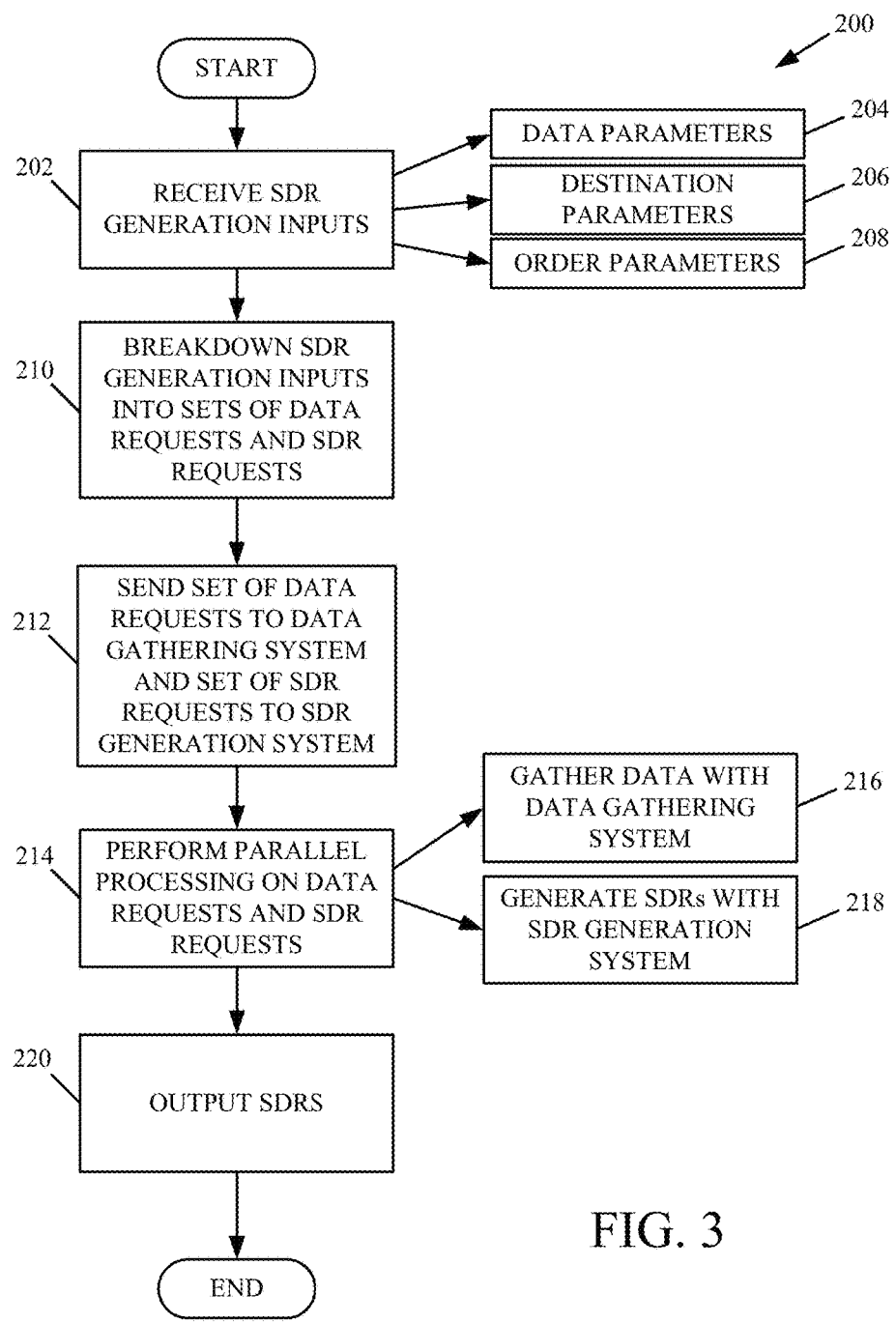
FIG. 3 is a flow diagram of a method for generating SDRs, in one example.

To illustrate operation of parallel processing framework 150, FIG. 3 is a flow diagram of a method 200 for generating SDRs, in one example. For sake of illustration, but not by limitation, method 200 will be described in the context of architecture 100 and data surfacing system 134.

At step 202, SDR generation inputs 158 are received from user 112 by controller component 156. The inputs 158 include data parameters 204 that define the data to be included in the SDRs and/or destination parameters 206 that define one or more destinations for the SDRs. For example, some of the SDRs can be generated for a printer destination while some of the SDRs are generated for an email system. Also, order parameters 208 can be obtained. The order parameters 208 define an output or rendering order for the SDRs, and can be explicitly defined in the inputs 158 and/or can be inferred from inputs 158.

Figure 4:
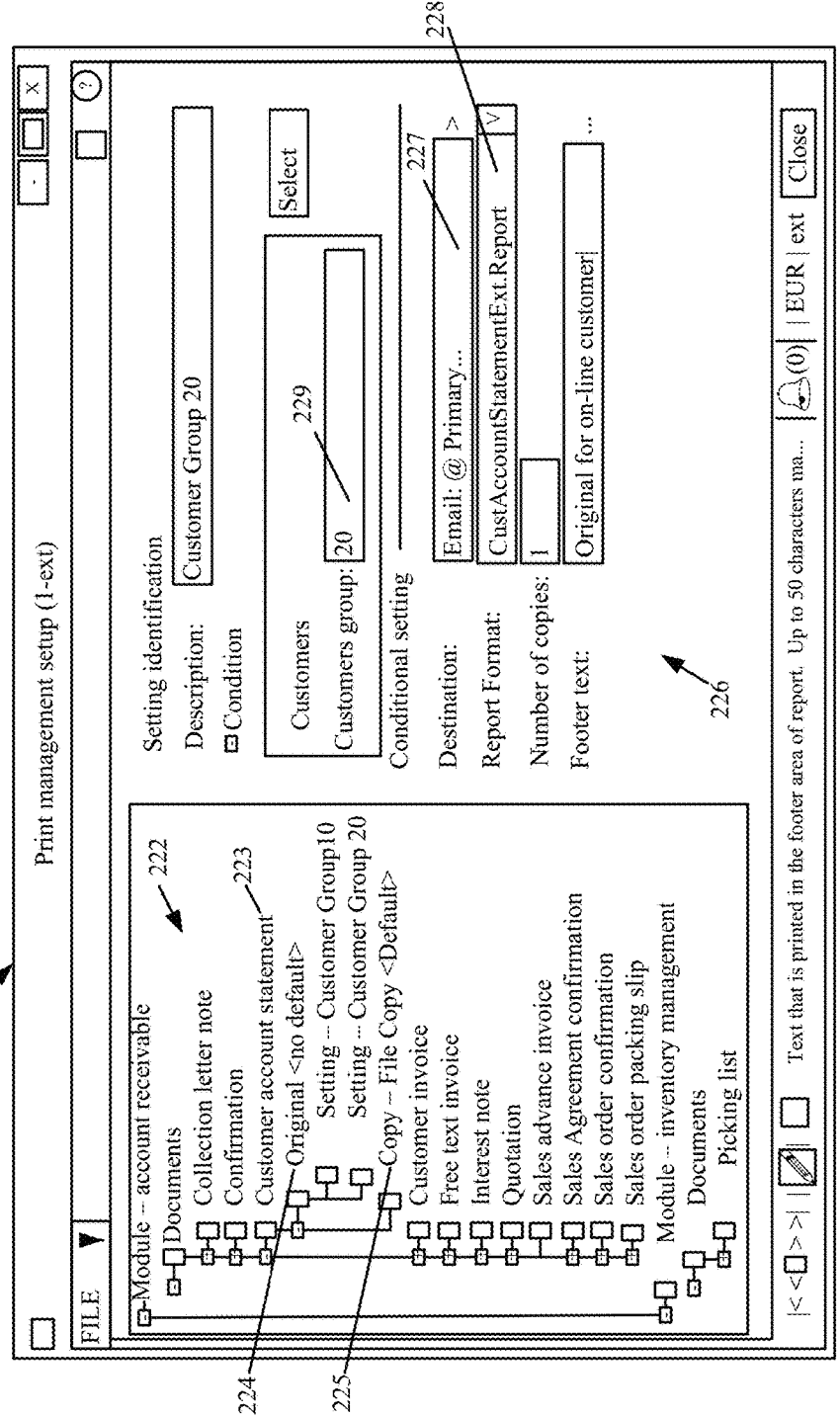
FIG. 4 is a screenshot of a user interface for receiving SDR generation inputs, in one example.

FIG. 4 is a screenshot of one example of a user interface 221 provided to user 112 to receive SDR generation inputs 158 at step 202. User interface 221 includes an SDR display window 222 that allows user 112 to create, view, and/or select one or more SDRs to configure. In the present example, user 112 has selected SDR 223 (i.e., "customer account statement") which can have multiple SDR instances. In the present example, the selected SDR 223 comprises an original document 224 and a file copy document 225 that are both to be output by data surfacing system 134.

The user selects one of the SDRs (i.e., either the original document SDR 224 or the file copy document SDR 225), and configures the corresponding SDR generation settings in a configuration window 226. For example, window 226 includes a destination field 227 that identifies the destination for the SDR and a format field 228 that defines a format for the SDR.

In the present example of FIG. 4, inputs 158 through user interface 221 specify that account statements are to be generated for customers of an organization. The inputs 158 identify a plurality of customers, illustratively using customer groups 229, for which the statements are to be generated. The inputs in field 227 define that the statements are to be emailed to each of the customers in customer group 229 using their primary email address.

Referring again to FIG. 3, at step 210, controller component 156 creates or otherwise obtains sets of data requests 157 and SDR requests 159. In one example, each SDR to be generated has at least one data request 157 with parameters that define the data to be obtained for the SDR and at least one SDR request 159 with parameters that define the destination and format of the SDR. In one example, controller component 156 breaks down the SDR generation inputs 158 into a series of SDR requests 159, each corresponding to a given SDR. The requests are sent to parallel framework 150 at step 212.

In one particular example of an SDR generation process, user 112 requests that customer statements are generated for ten thousand customers of an organization. In response, controller component 156 breaks down this generation input into sets of ten thousand data and SDR requests, which are then sent to parallel processing framework 150.

At step 214, framework 150 performs parallel processing, in which data gathering system 152 and SDR generation system 154 operate in parallel to process the requests. As illustrated, at step 216 data gathering system 152 operates to gather data for some of the data requests 157 while SDR generation system 154 operates to generate SDRs at step 218. For example, SDR generation system 154 generates an SDR with data from one of the data requests 157 while data gathering system 152 gathers data for another of the requests 157. At step 220, the SDRs 136 are output by framework 150.

Figure 5:
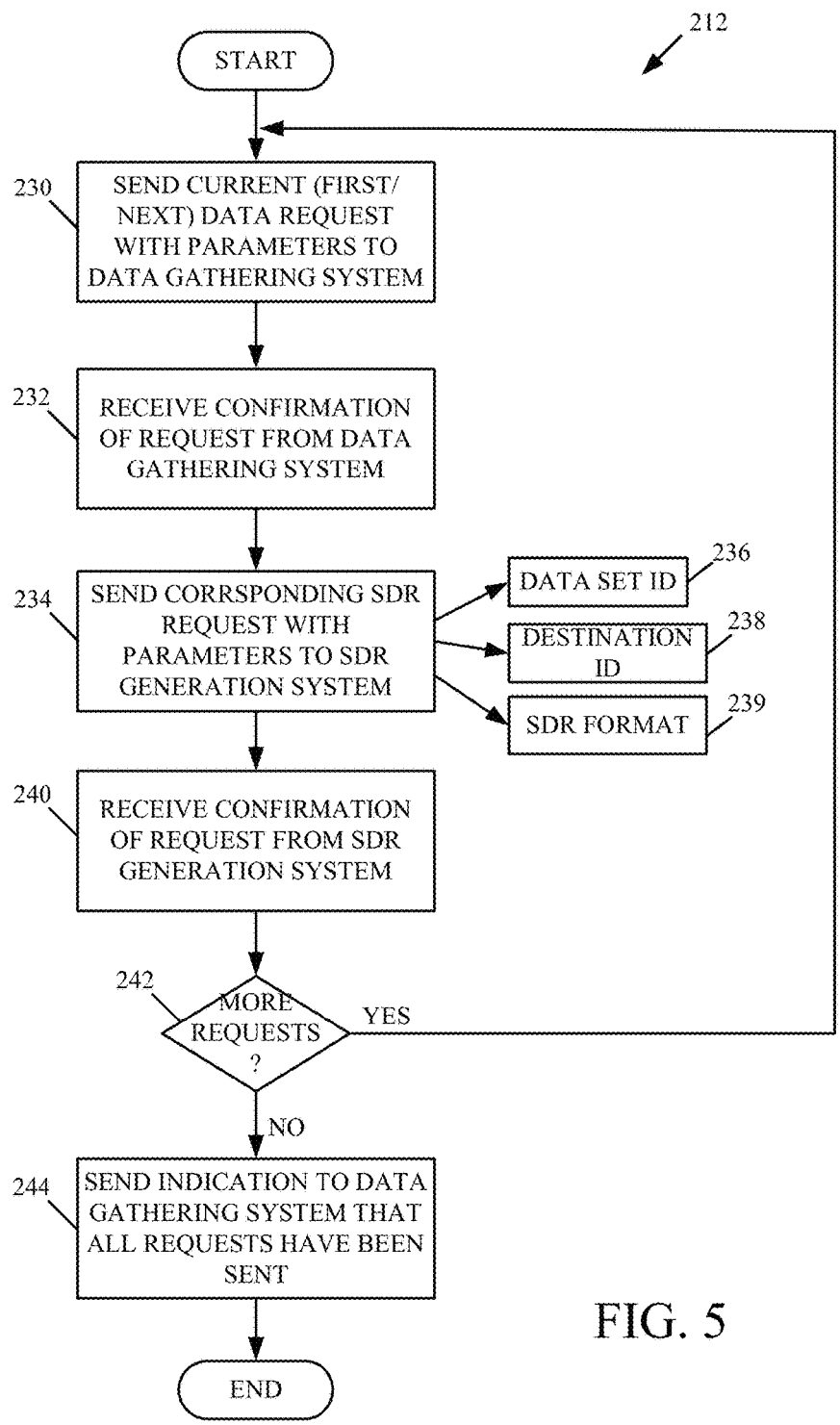
FIG. 5 is a flow diagram of one example of a method for sending a set of requests for generating SDRs to a parallel processing framework.

FIG. 5 is a flow diagram of one example of a method for sending a set of requests for generating SDRs to a parallel processing framework. For example, the method of FIG. 5 can be performed by controller component 156 at step 212 illustrated in FIG. 3. For sake of illustration, but not by limitation, FIG. 5 will be described in the context of data surfacing system 134.

As mentioned above, in one example controller component 156 generates or otherwise obtains a series of requests corresponding to a set of SDRs to be generated. At step 230, controller component 156 sends a current data request 157 in the series (i.e., a first request in this iteration) with corresponding parameters to data gathering system 152.

After receiving the current data request, data gathering system 152 stores the request and corresponding parameters (e.g., data parameters 204) in data request store 166. Then, system 152 sends a confirmation to controller component 156 that the request has been stored for eventual processing by a data generator 173. This confirmation is received by controller component 156 at step 232.

At step 234, controller component 156 sends the corresponding SDR request 159 (or other indication of the current data request 157) with parameters to SDR generation system 154. In one example, the parameters sent at step 234 includes a data set identifier 236 (e.g., a data table ID) indicative of the data set that is being generated by data gathering system 152 for the current data request 157 and a destination identifier 238 (e.g., destination parameters 206). Identifier 238 identifies the destination for the SDR corresponding to the current data request 157. Also, the parameters can identify an SDR format 239, such as a type of document or report to be generated with the data.

After receiving the request, SDR generation system 154 creates or updates the request status store 172 to indicate the current request 159 along with the corresponding parameters. Then, system 154 sends a confirmation to controller component 156 that the SDR request 159 has been stored for eventual processing by a SDR generator 177. This confirmation is received by controller component 156 at step 240.

At step 242, controller component 156 proceeds to determine whether there are any additional requests to be sent to framework 150. If so, the method returns to step 230 for a next data request 157 in the sequence of requests. If not, the method proceeds to step 244 in which controller component 156 determines that all of the data requests 157 have been sent and then sends a completion signal to data gathering system 152 indicating that all data requests 157 have been provided.

Figure 6:
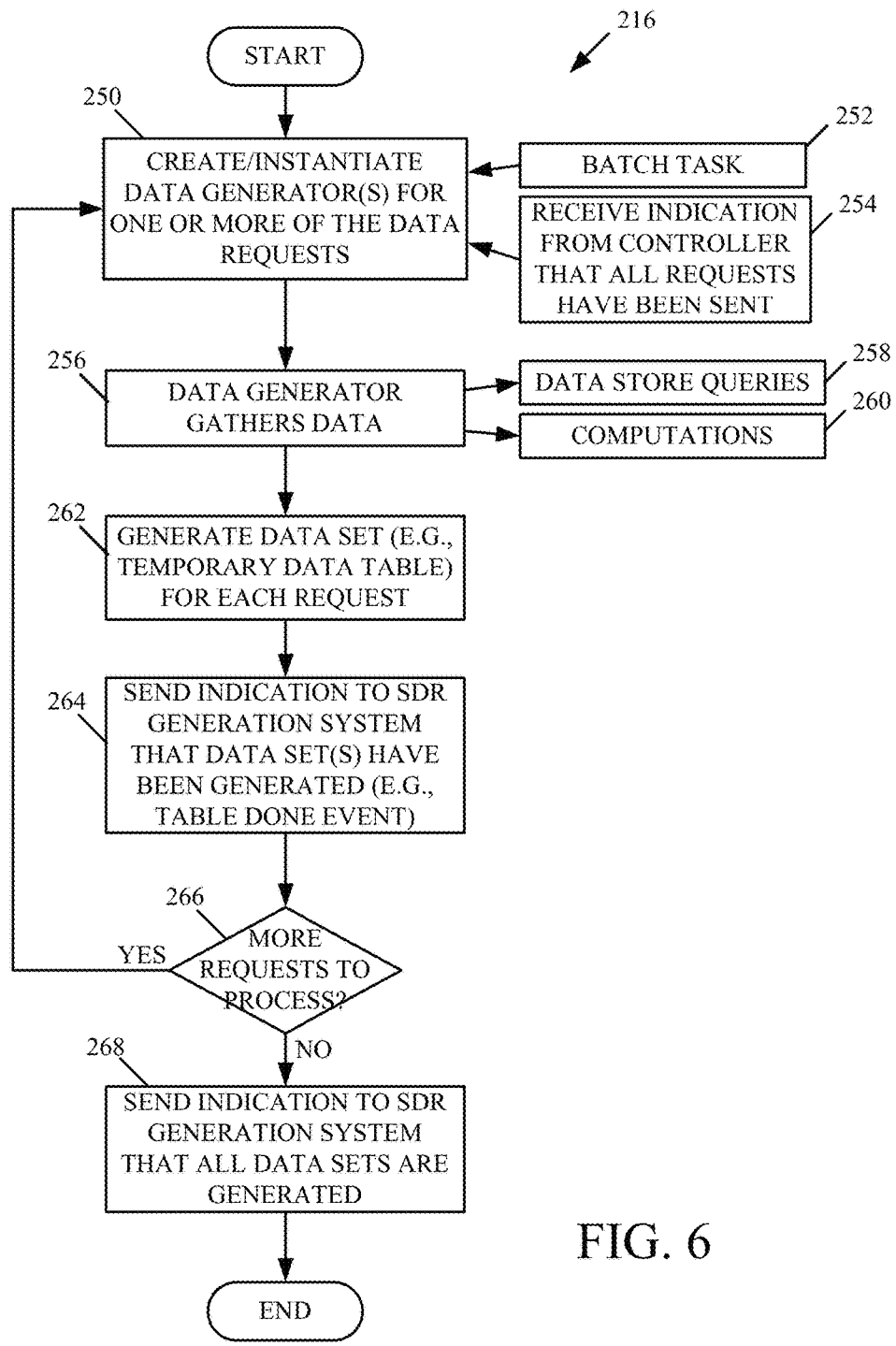
FIG. 6 is a flow diagram of one example of a method for gathering data to generate SDRs.

FIG. 6 is a flow diagram of one example of a method for gathering data to generate SDRs. For example, the method of FIG. 6 can be performed by data gathering system 152 at step 216 illustrated in FIG. 3. For sake of illustration, but not by limitation, FIG. 6 will be described in the context of data surfacing system 134.

At step 250, data generator creation component 170 creates or instantiates a data generator 173 for one or more of the requests stored in data request store 166. In one example, step 250 can be initiated by a batch task at step 252 that batches or groups a plurality of the data requests. For instance, data gathering system 152 can collect a threshold number of data requests in data request store 166 before initiating step 250 to process the requests. Also, at step 250, component 170 can create a plurality of data generators 173 to operate in parallel. Further, step 250 can be initiated in response to receiving an indication at step 254 that controller component 156 has sent all requests (e.g., the indication from step 244).

At step 256, each data generator 173 accesses data store 114 to gather the requested data based on the parameters of the data request. For example, data generator 173 can perform data store queries at step 258 and/or perform computations on the data at step 260.

At step 262, a data set is generated for each of the requests. The data set is stored in data set store 171. For example, data gathering system 152 generates a temporary data table for each of the requests.

At step 264, data gathering system 152 sends a signal to SDR generation system 154 indicating that the data set for the one or more data requests has completed. For example, the signal can be sent by the data generator 173 that generated the data set. The signal can comprise a table done event that is sent to SDR generation system 154 to indicate that data tables have been generated for the requests.

At step 266, data gathering system 152 determines whether there are any more data requests stored in data request store 166 that need to be processed. If so, the method returns to step 250 to process those additional requests. If not, the method proceeds to step 268 in which data gathering system 152 sends a signal to SDR generation system 154 indicating that all of the data requests have been completed.

Figure 7:
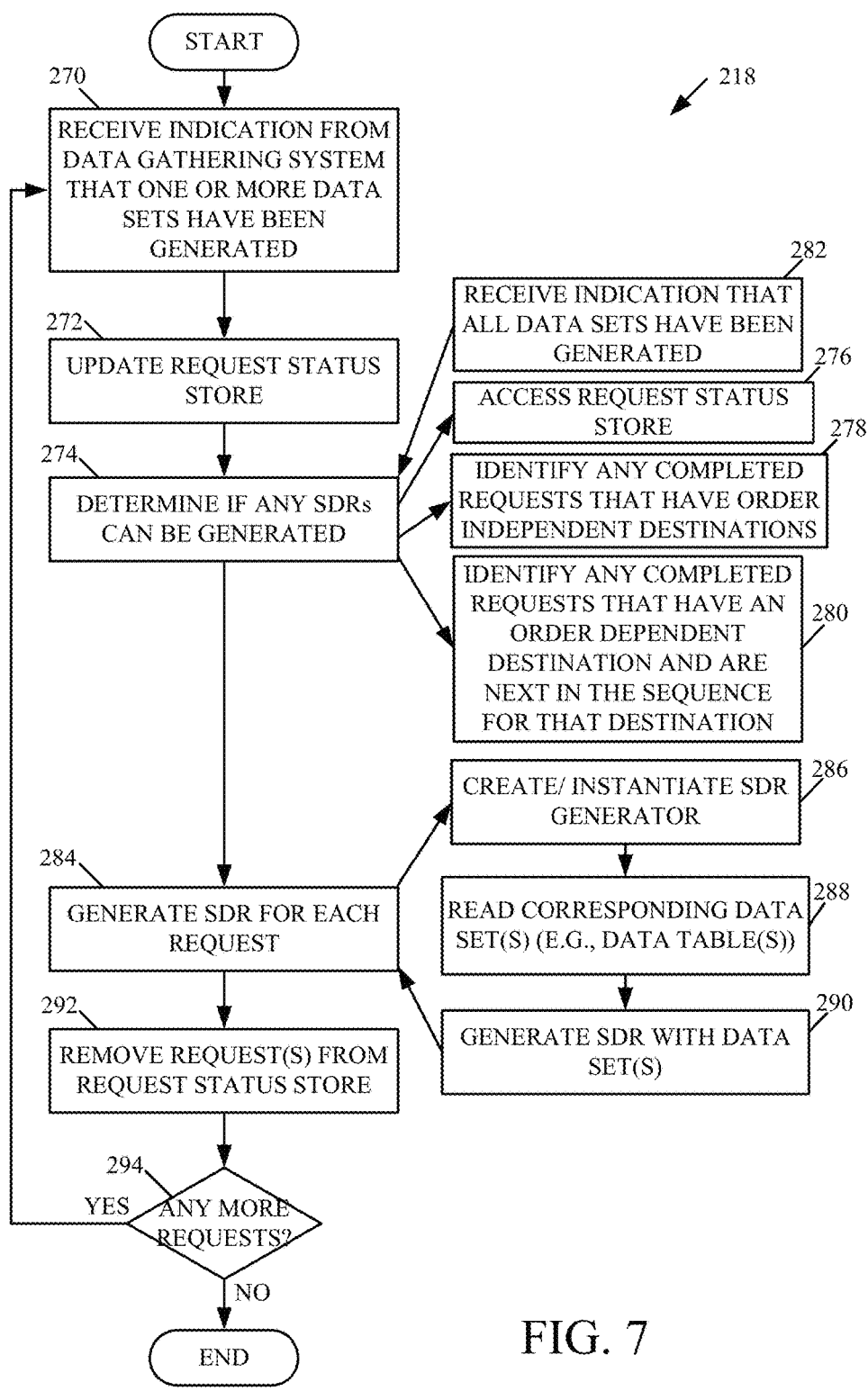
FIG. 7 is a flow diagram of one example of a method for generating SDRs.

FIG. 7 is a flow diagram of one example of a method for generating SDRs. For example, the method of FIG. 7 can be performed by SDR generation system 154 at step 218 illustrated in FIG. 3. For sake of illustration, but not by limitation, FIG. 7 will be described in the context of data surfacing system 134.

At step 270, SDR generation system 154 receives an indication that the data set(s) for one or more of the data requests have been generated. For example, SDR generation system 154 receives the indication sent by data gathering system 152 at step 264. The indication can include a reference to the data request and/or the data set generated for the data request. At step 272, the request status store 172 is updated based on the indication received at step 270. One example of a request table 174, that is updated at step 272, is illustrated in FIG. 8.

As shown in FIG. 8, request table 174 comprises a plurality of entries 300-318, each representing a request for a corresponding SDR. In the illustrated example, the entries 300-318 are arranged in an order in which controller component 156 issued the corresponding data requests 157. This order is identified by a sequence number field 320. Additionally, each entry includes a destination identifier field 322 and a data set identifier field 324. Data set identifier field 324 identifies the data set for the corresponding SDR. For example, data set identifier field 324 can comprise a data table ID that identifies the data table that will be or has been generated by data gathering system 152. A completion field 326 indicates whether the data request has been completed. For example, completion field 326 can include a Boolean true/false flag that indicates whether the data set identified in field 324 has been generated.

Referring again to FIG. 7, at step 274 SDR generation system 154 determines whether any of the SDRs can be generated. In one example, step 274 accesses request table 174 at step 276 and identifies the requests for which the data gathering process has been completed (i.e., by analyzing field 326). At step 278, completed requests that have destinations that are not order-dependent are identified and selected for SDR generation at step 284. In the example of FIG. 8, entries 312, 314, and 318 are selected at step 278.

Also, at step 280, the method determines whether any completed requests have destinations that are order-dependent, where the completed request is next in the sequence for that destination. For instance, in the example of FIG. 8, the request for entry 300 has an order-dependent destination (i.e., printer 1). In this case, entry 300 is selected for SDR generation at step 284. Additionally, the request from entry 304 can also be processed as it also has been completed, and is next in the sequence order for the same destination. Conversely, in this example, the request from entry 310 is not selected for SDR generation as it is not the next request in the sequence for its destination (i.e., printer 2) because the request for entry 306, also for printer 2, has not been completed. Accordingly, step 280, in one example, ensures that even if requests for an order-dependent destination are executed by data gathering system 152 out-of-order with respect to a desired SDR output/rendering sequence, they are reordered by SDR generation system 154.

In one example of step 274, an indication is received from data gathering system 152 indicating that all of the data requests have been processed. This is represented at step 282. At this point, the method proceeds with selecting remaining entries for SDR generation at step 284. This includes, in one example, ignoring or removing any data requests that have not been completed by data gathering system 152 as there has been no data gathered for those requests. To illustrate, in the case of generating balance due statements for a number of customers, it may be that a given customer does not have an outstanding balance. As such, data gathering system 152 may not return any data for that request.

In one example of step 284, an SDR generator 177 is created or instantiated by component 176 at step 286 for each request selected at step 274. Then, at step 288, the SDR generator 177 retrieves the corresponding data set stored in data set store 171 to generate the SDR at step 290.

At step 292, the method removes the corresponding requests from request status store 172. At step 294, the method determines whether there are any more requests to be processed. If so, the method returns to step 270.

It can thus be seen that the present description provides significant technical advantages. It provides a framework for surfacing data in which data gathering and SDR generation operations execute in parallel. As such, the framework improves the performance of the computing environment, itself, in surfacing data. For example, the framework can reduce the time required to perform a data surfacing process.

The present discussion mentions processors and servers. In one example, the processors and servers include computer processors with associated memory and timing circuitry, not separately shown. They are functional parts of the systems or devices to which they belong and are activated by, and facilitate the functionality of the other modules, components and/or items in those systems.

Also, a number of user interface displays have been discussed. They can take a wide variety of different forms and can have a wide variety of different user actuatable input mechanisms disposed thereon. The user actuatable input mechanisms sense user interaction with the computing system. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores are also discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
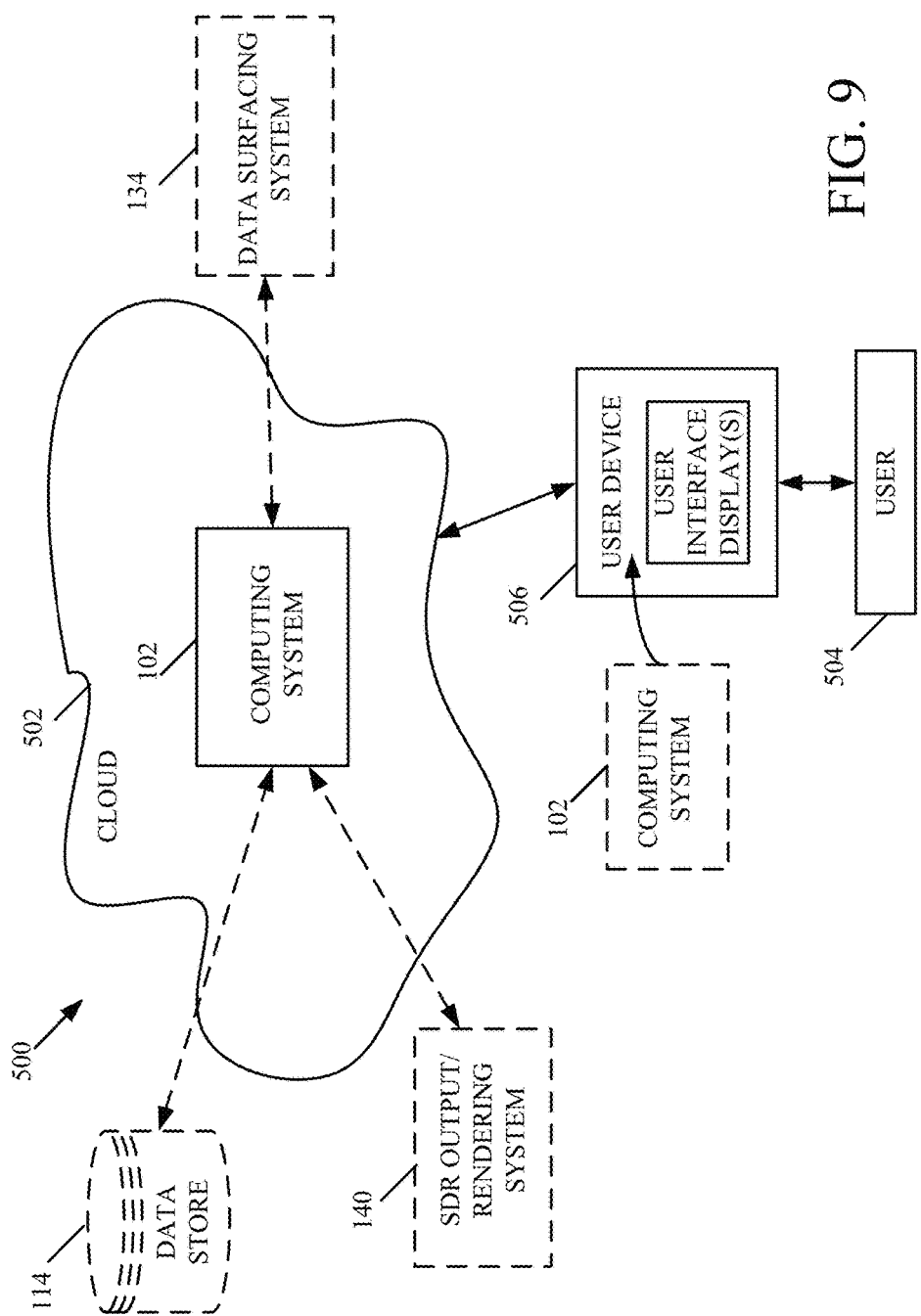
FIG. 9 is a block diagram showing one example of the computing system illustrated in FIG. 1, deployed in a cloud computing architecture.

FIG. 9 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software, modules, or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the modules, components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items correspond to those shown in FIG. 1 and they are similarly numbered. FIG. 9 specifically shows that computing system 102 is located in cloud 502 (which can be public, private, or a combination where portions are public while others are private). Therefore, a user 504 (e.g., user 112) uses a user device 506 to access system 102 through cloud 502.

FIG. 9 also depicts another embodiment of a cloud architecture. FIG. 9 shows that it is also contemplated that some components of computing system 102 are disposed in cloud 502 while others are not. In one example, data store 114 can be disposed outside of cloud 502, and accessed through cloud 502. In another example, data surfacing system 134 can be disposed outside of cloud 502. In another example, SDR output/rendering system 140 can be disposed outside of cloud 502. Regardless of where they are located, system 102 components can be accessed directly by device 506, through a network (either a wide area network or a local area network), they can be hosted at a remote site by a service, or they can be provided as a service through a cloud or accessed by a connection service that resides in the cloud. FIG. 9 also shows that system 102, or parts of it, can be deployed on user device 506. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
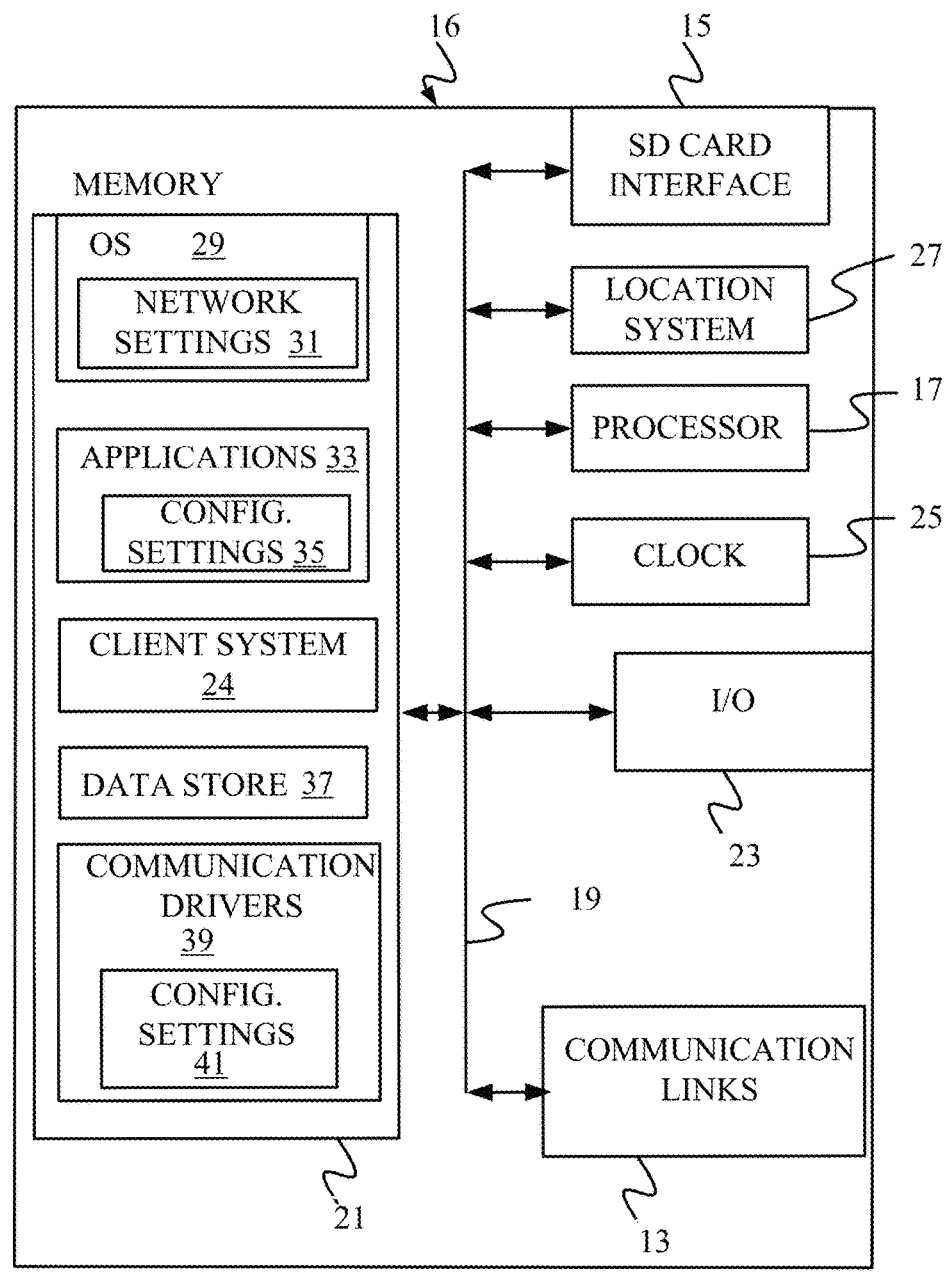
FIG. 10-14 show various examples of mobile devices that can be used with the computing system shown in FIG. 1.

FIG. 10 is a simplified block diagram of one example of a handheld or mobile computing device that can be used as a user's or client's hand held device 16, in which the present system (or parts of it) can be deployed. FIGS. 11-14 are examples of handheld or mobile devices.

FIG. 10 provides a general block diagram of the components of a client device 16 that can run modules or components of architecture 100 or that interacts with architecture 100, or both. In the device 16, a communications link 13 is provided that allows the handheld device to communicate with other computing devices and in some examples provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

In other examples, applications or systems are received on a removable Secure Digital (SD) card that is connected to a SD card interface 15. SD card interface 15 and communications link 13 communicate with a processor 17 (which can also embody processor(s) 104 from FIG. 1 and/or processor(s) 160 from FIG. 2) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 comprises a real time clock component that outputs a time and date. It can also provide timing functions for processor 17.

Location system 27 includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. It can also store a client system 24 which can be part or all of architecture 100. Memory 21 can include all types of tangible volatile and nonvolatile computer-readable memory devices. It can also include computer storage media (described below). Memory 21 stores computer readable instructions that, when executed by processor 17, cause the processor to perform computer-implemented steps or functions according to the instructions. Processor 17 can be activated by other modules or components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 11:
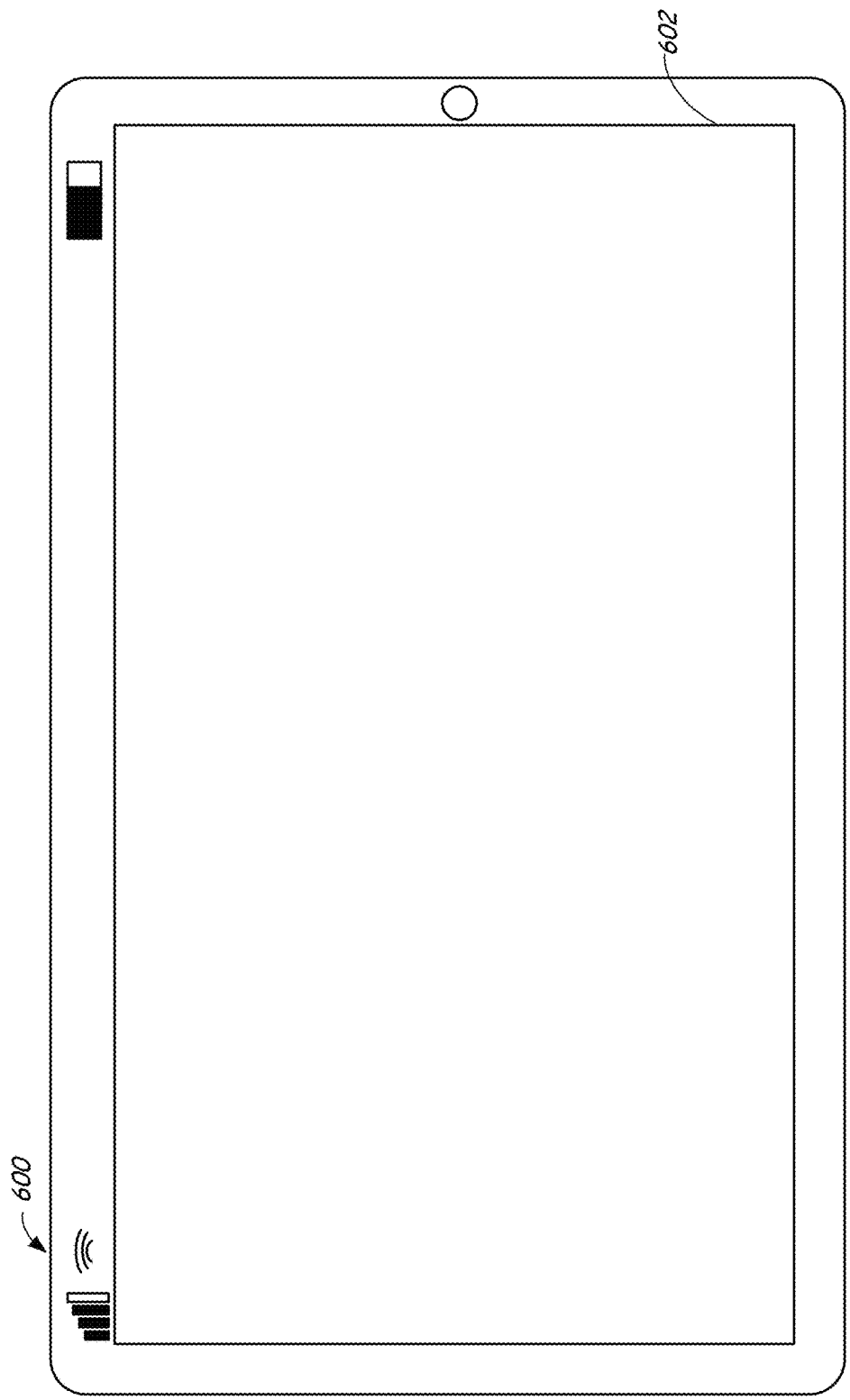

FIG. 11 shows one example in which device 16 is a tablet computer 600. In FIG. 11, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also receive voice inputs as well.

Figure 12:
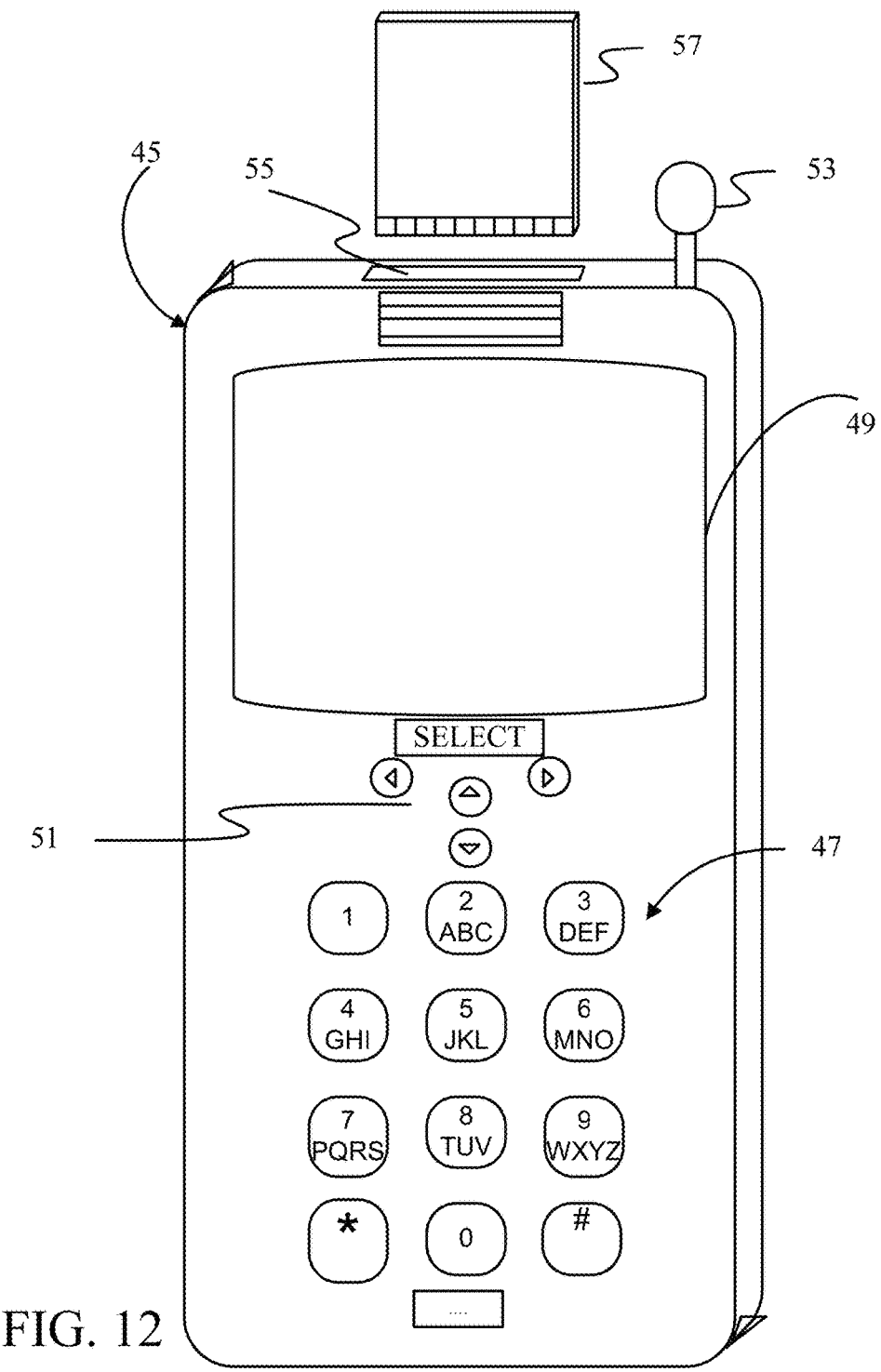
Figure 13:
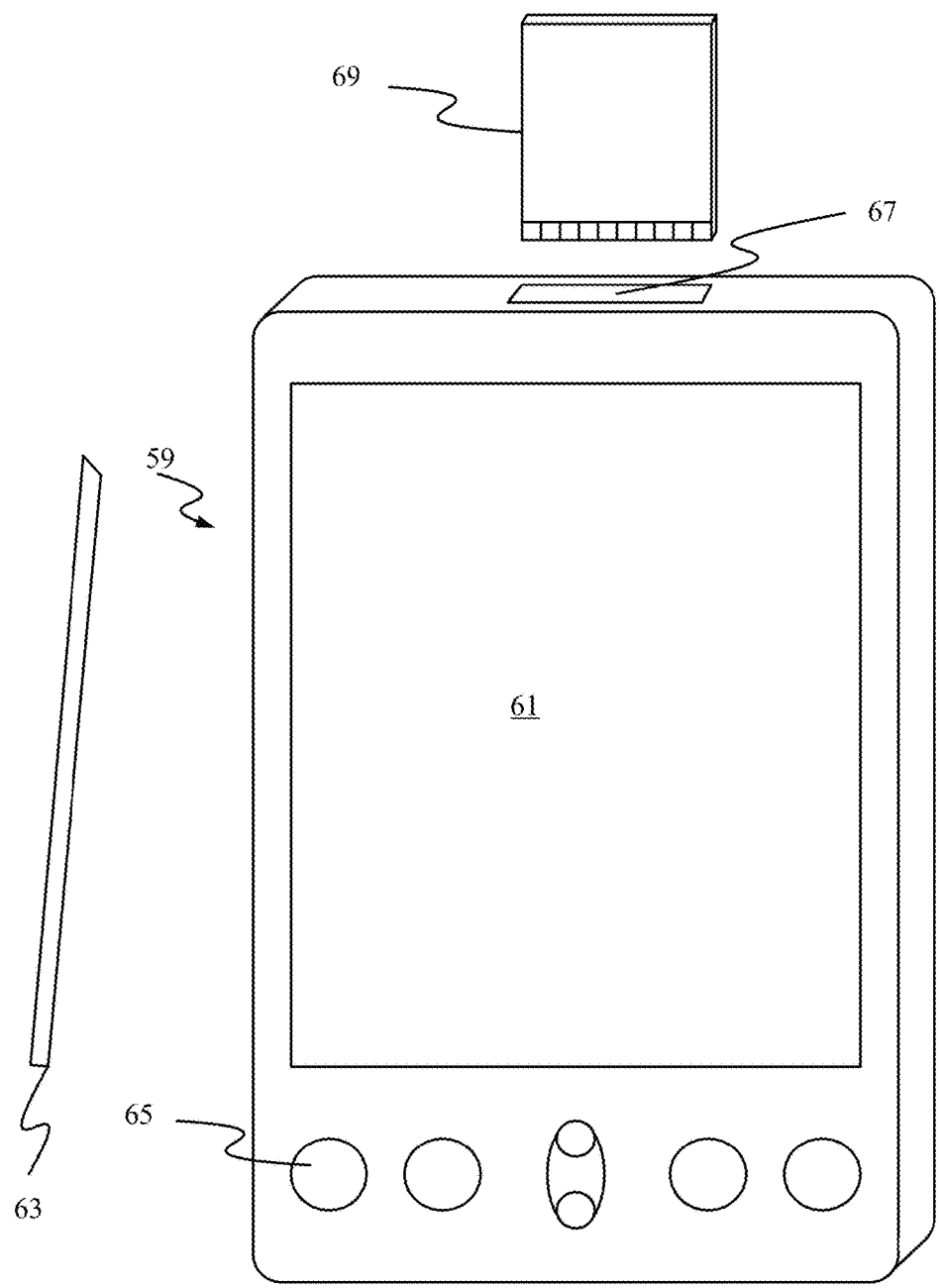

FIGS. 12 and 13 provide additional examples of devices 16 that can be used, although others can be used as well. In FIG. 12, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some examples, phone 45 also includes a Secure Digital (SD) card slot 55 that accepts a SD card 57.

The mobile device of FIG. 13 is a personal digital assistant (PDA) 59 or a multimedia player or a tablet computing device, etc. (hereinafter referred to as PDA 59). PDA 59 includes an inductive display screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display screen 61, and allow the user to change applications or select user input functions, without contacting display screen 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one example, PDA 59 also includes a SD card slot 67 that accepts a SD card 69.

Figure 14:
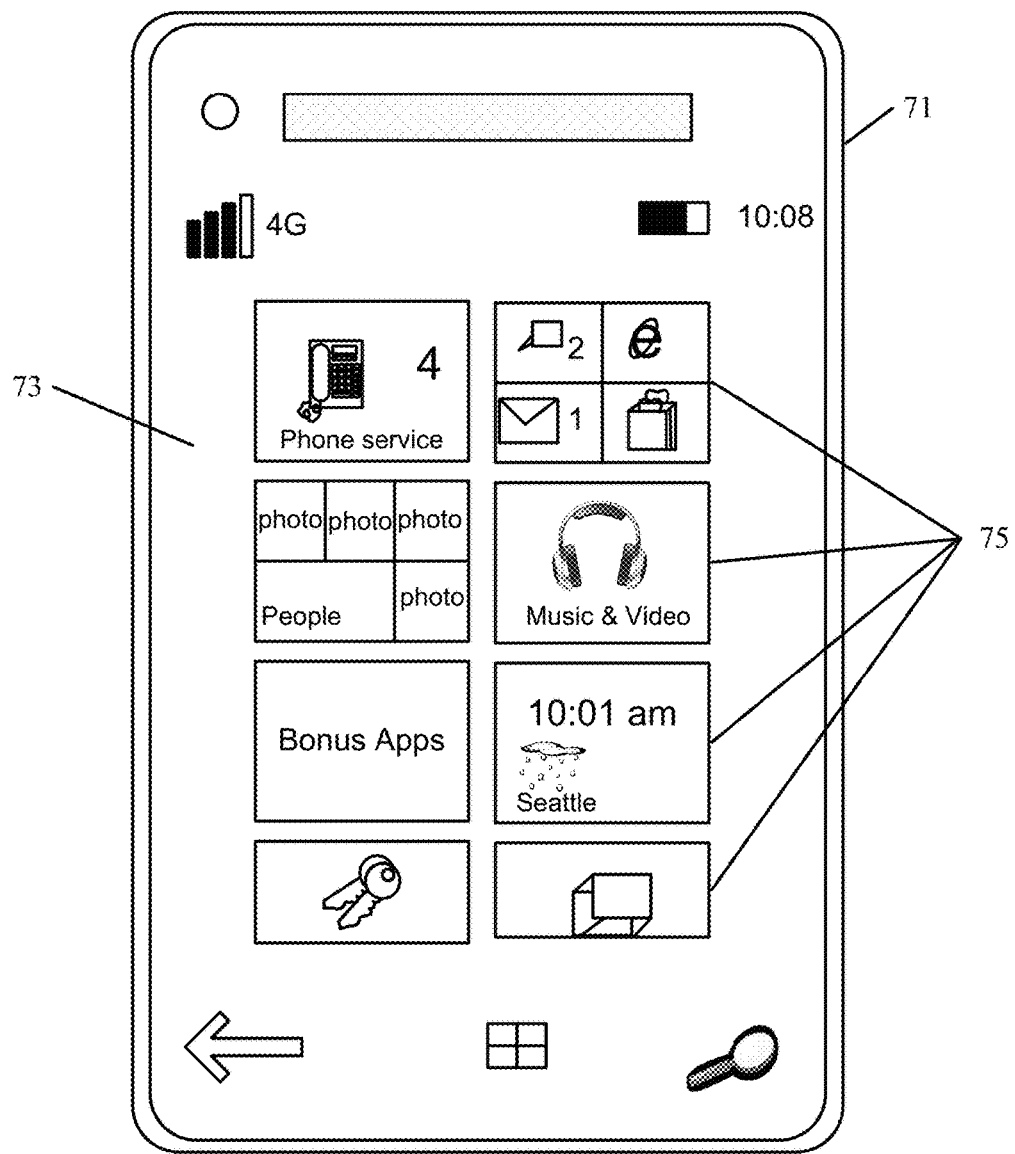

FIG. 14 is similar to FIG. 12 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
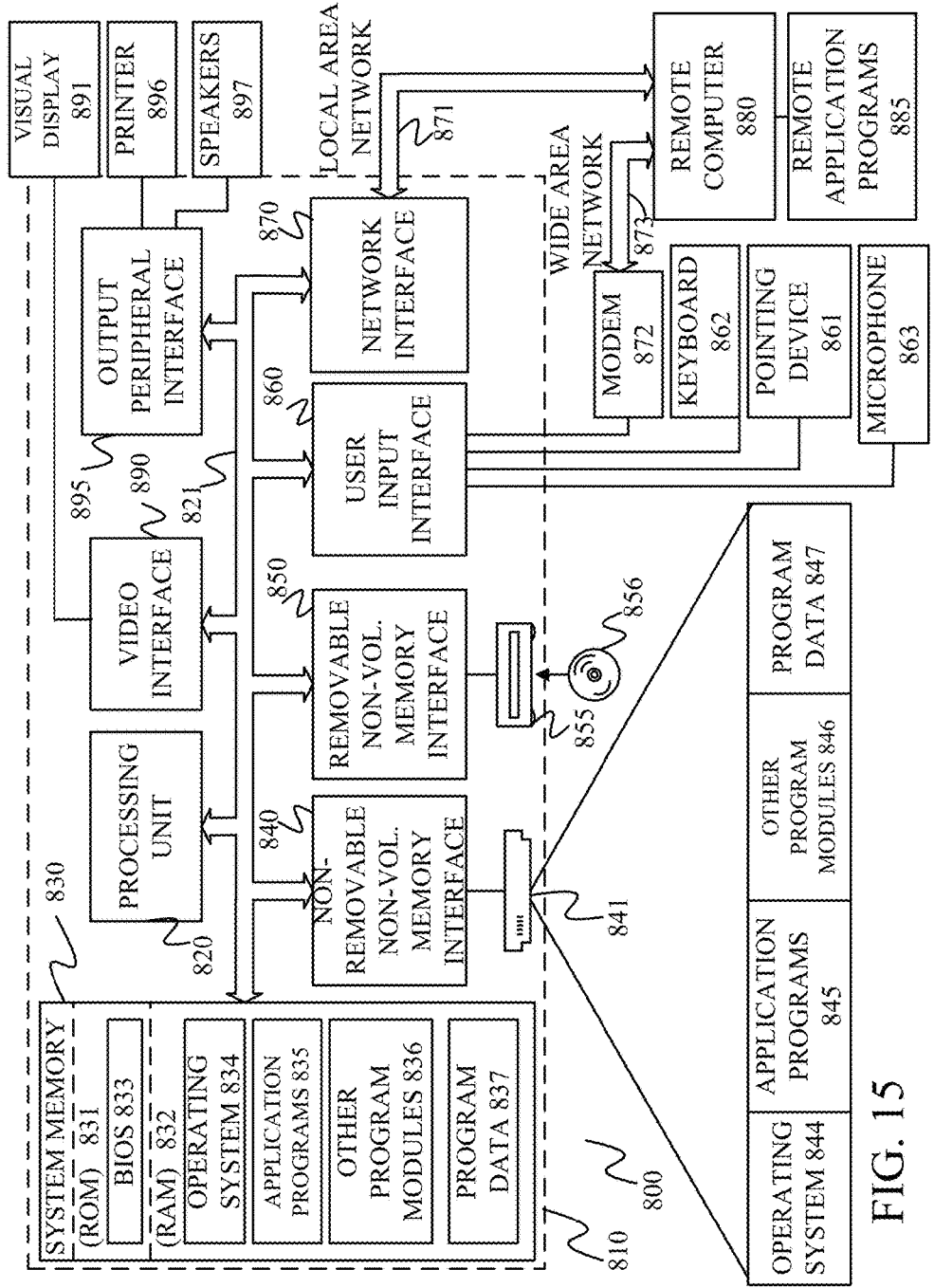
FIG. 15 is a block diagram of one example computing environment.

FIG. 15 is one example of a computing environment in which architecture 100, or parts of it, (for example) can be deployed. With reference to FIG. 15, an exemplary system for implementing some examples includes a general-purpose computing device in the form of a computer 810. Components of computer 810 may include, but are not limited to, a processing unit 820 (which can comprise processor(s) 104 and/or 160), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 15 include a local area network (LAN) 871 and a wide area network (WAN) 773, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 15 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a parallel processing framework for generating structured data representations (SDRs) in a computing system. The parallel processing framework comprises a data gathering system configured to receive a set of data requests, each corresponding to at least one structured data representation (SDR). The data gathering system is configured to obtain a data set for each of the data requests. The parallel processing framework includes an SDR generation system configured to receive indications of the plurality of data requests and, for each data request, an indication as to whether the data set corresponding to the data request has been obtained by the data gathering system. The SDR generation system is configured to generate the plurality of SDRs with the data sets obtained by the data gathering system.

Example 2 is the parallel processing framework of any or all previous examples, wherein the SDR generation system performs an SDR generation process to generate an SDR for one of the data requests while the data gathering system performs a data gathering process to obtain the data set for another one of the data requests.

Example 3 is the parallel processing framework of any or all previous examples, wherein the plurality of SDRs comprises a plurality of reports that are generated to include the data sets.

Example 4 is the parallel processing framework of any or all previous examples, wherein the data gathering system receives the set of data requests from a controller component, each data request including data request parameters that are used by the data gathering system to obtain the data set from a data store.

Example 5 is the parallel processing framework of any or all previous examples, wherein the SDR generation system receives the indications of the plurality of data requests from the controller component, each indication identifying a destination for the corresponding SDR and a location of the data set for the corresponding SDR.

Example 6 is the parallel processing framework of any or all previous examples, wherein the data gathering system stores the set of data requests in a queue.

Example 7 is the parallel processing framework of any or all previous examples, wherein the data gathering system is configured to perform a batch processing task on a plurality of the data requests in the queue.

Example 8 is the parallel processing framework of any or all previous examples, wherein the data gathering system is configured to send a signal to the SDR generation system based on obtaining a data set for a data request.

Example 9 is the parallel processing framework of any or all previous examples, wherein the data sets comprise a plurality of data tables, each data table being generated for one or more of the SDRs.

Example 10 is the parallel processing framework of any or all previous examples, and further comprising a request status store that stores a plurality of request entries, each entry representing a given one of the data requests and identifying whether the data set for the given data request has been obtained by the data gathering system.

Example 11 is the parallel processing framework of any or all previous examples, wherein the SDR generation system updates the request status store based on the signal received from the data gathering system.

Example 12 is the parallel processing framework of any or all previous examples, wherein the request status store comprises a request table that is generated by the SDR generation system.

Example 13 is the parallel processing framework of any or all previous examples, wherein the request status store indicates a sequential order of the set of data requests, and each entry in the request status store identifies a destination for the SDR corresponding to the given data request.

Example 14 is the parallel processing framework of any or all previous examples, wherein the SDR generation system is configured to generate the plurality of SDRs based on the sequential order of the set of data requests and a destination type for each SDR.

Example 15 is the parallel processing framework of any or all previous examples, wherein the SDR generation system is configured to generate the plurality of SDRs based on whether the destinations are order dependent destinations.

Example 16 is a computing system for generating structured data representations (SDRs). The computing system comprises a controller component configured to receive an SDR generation input for generating a set of SDRs and to obtain, based on the SDR generation input, a set of SDR generation requests, each SDR generation request having at least one corresponding data request with parameters that define data to be obtained for an SDR. The computing system comprises a data gathering system configured to obtain a data set for each data request, and an SDR generation system configured to perform an SDR generation process for one of the SDR generation requests while the data gathering system performs a data gathering process for another one of the SDR generation requests.

Example 17 is the computing system of any or all previous examples, comprising a request status store that stores a plurality of request entries, each entry representing at least one of the SDR generation requests and identifying whether a data set for the at least one SDR generation request has been obtained by the data gathering system.

Example 18 is the computing system of any or all previous examples, wherein the SDR generation system performs the SDR generation process based on the request status store.

Example 19 is a computer-implemented method, comprising receiving a set of structured data representation (SDR) requests, each request identifying data parameters for a corresponding SDR, and generating a set of SDRs using a parallel processing framework that simultaneously performs a data gathering process for the set of SDR requests and an SDR generation process for the set of SDR requests. The method includes outputting the set of SDRs.

Example 20 is the computer-implemented method of any or all previous examples, wherein the set of SDR requests define an order for the corresponding set of SDRs, and wherein generating the set of SDRs comprises obtaining data sets for the set of SDR requests in an order that is different than the defined order for the corresponding set of SDRs, and performing the SDR generation process to output the corresponding set of SDRs based on the defined order.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What is claimed is:

1. A computing system comprising:
  a processor; and
  memory storing instructions executable by the processor, wherein the instructions, when executed, configure the computing system to provide:
    a controller component configured to:
      receive an input request for a structured data representation (SDR) to be generated; and
      based on the input request,
        generate a plurality of data requests, each data request identifying a requested data set for the SDR; and
        define a sequential order associated with the plurality of data request;
    a data gathering system; and
    an SDR generation system configured to:
      generate a plurality of data entries in a request status store, each data entry including:
        a mapping attribute that maps the data entry to a corresponding one of the data requests that is represented by the data entry,
        a status attribute indicating whether the requested data set for the corresponding data request has been obtained by the data gathering system, and
        a destination identifier that identifies a destination for the requested data set that corresponds to the data request represented by the data entry,
        wherein the plurality of data entries indicate the sequential order for the plurality of data requests; and
      based on the status and mapping attributes, retrieve the requested data set for a first one of the data requests obtained by the data gathering system; and
      based on the sequential order associated with the plurality of data requests and a destination type of a destination system, generate an SDR rendering instruction that instructs the destination system to output the requested data set for the first data request while the data gathering system performs a data gathering operation to gather the requested data set for a second one of the data requests.

2. The computing system of claim 1, wherein the SDR comprises a plurality of documents that are generated to include the data sets.

3. The computing system of claim 1, wherein the data gathering system is configured to:
  receive the set of data requests from the controller component, each data request including a data request parameter; and
  based on the data request parameter, obtain the data set from a data store.

4. The computing system of claim 2, wherein each of the plurality of data requests corresponds to one of the documents, the data request identifying a destination for the corresponding document and a storage location of the data set for the corresponding document.

5. The computing system of claim 1, wherein the data gathering system is configured to store the set of data requests in a queue.

6. The computing system of claim 5, wherein the data gathering system is configured to perform a batch processing task on a plurality of the data requests in the queue.

7. The computing system of claim 1, wherein the data gathering system is configured to:
  based on obtaining the requested data set for each data request, send a signal to the SDR generation system that indicates that the data request has been completed.

8. The computing system of claim 7, wherein the obtained data sets are stored in a plurality of data tables, each data table being generated for one or more of the data requests.

9. The computing system of claim 7, wherein the SDR generation system is configured to update the request status store based on the signal received from the data gathering system.

10. The computing system of claim 9, wherein the request status store comprises a request table that is generated by the SDR generation system.

11. The computing system of claim 1, wherein the SDR generation system is configured to generate the SDR rendering instruction based on whether the destination system is order-dependent.

12. A computing system comprising:
a processor; and
memory storing instructions executable by the processor, wherein the instructions, when executed, configure the computing system to:
receive a structured data generation request for a plurality of documents to be generated;
generate a plurality of data requests, each data request corresponding to one of the documents and identifying a requested data set for the corresponding document;
define a sequential order associated with the plurality of documents;
generate a plurality of data entries, each data entry including:
a mapping attribute that maps the data entry to the data request that corresponds to the document that is represented by the data entry,
a destination attribute that identifies a destination system associated with outputting the document that is represented by the data entry, and
a status attribute indicating whether the requested data set for the corresponding data request has been obtained,
wherein the plurality of data entries indicate the sequential order;
retrieve the requested data set for a first one of the data requests;
determine whether the destination system associated with outputting a first document corresponding to the first data request is order-dependent;
if the destination system is order-dependent, generate a rendering instruction that instructs the destination system to output the first document in accordance with sequential order; and
if the destination system is not order-dependent, generate a rendering instruction that instructs the destination system to output the first document regardless of the sequential order.

13. The computer system of claim 12, and further comprising:
a request status store configured to store a plurality of request entries, each entry identifying whether the data set for the data request represented by the entry has been obtained.

14. A method performed by a computing system, the method comprising:
receiving an input request for a structured data representation (SDR) to be generated;
based on the input request,
generating a plurality of data requests, each data request identifying a requested data set for the SDR; and
defining a sequential order associated with the plurality of data request;
generating a plurality of data entries in a request status store, each data entry including:
a mapping attribute that maps the data entry to a corresponding one of the data requests that is represented by the data entry,
a status attribute indicating whether the requested data set for the corresponding data request has been obtained by the data gathering system, and
a destination identifier that identifies a destination for the requested data set that corresponds to the data request represented by the data entry,
wherein the plurality of data entries indicate the sequential order for the plurality of data requests; and
based on the status and mapping attributes, retrieving the requested data set for a first one of the data requests obtained by the data gathering system; and
based on the sequential order associated with the plurality of data requests and a destination type of a destination system, generating an SDR rendering instruction that instructs the destination system to output the requested data set for the first data request while the data gathering system performs a data gathering operation to gather the requested data set for a second one of the data requests.

15. The method of claim 14, wherein the SDR comprises a plurality of documents that are generated to include the data sets.

16. The method of claim 14, and further comprising:
receiving the set of data requests from the controller component, each data request including a data request parameter; and
based on the data request parameter, obtaining the data set from a data store.

17. The method of claim 16, wherein each of the plurality of data requests corresponds to one of the documents, the data request identifying a destination for the corresponding document and a storage location of the data set for the corresponding document.

18. The method of claim 14, and further comprising:
performing a batch processing task on a plurality of the data requests.

19. The method of claim 14, and further comprising:
generating the SDR rendering instruction based on whether the destination system is order-dependent.

20. The method of claim 14, wherein the request status store comprises a request table.

* * * * *